United States Patent
Chin et al.

(10) Patent No.: US 8,930,721 B2
(45) Date of Patent: *Jan. 6, 2015

(54) PERSONAL COMPUTING DEVICE HAVING SINGLE-CELL BATTERY

(75) Inventors: Vance Chin, San Francisco, CA (US); Jonathan Betts-LaCroix, Chatsworth, CA (US)

(73) Assignee: Google Inc., Mountain View, CA (US)

( * ) Notice: Subject to any disclaimer, the term of this patent is extended or adjusted under 35 U.S.C. 154(b) by 1109 days.

This patent is subject to a terminal disclaimer.

(21) Appl. No.: 12/367,051

(22) Filed: Feb. 6, 2009

(65) Prior Publication Data

US 2009/0150690 A1 Jun. 11, 2009

Related U.S. Application Data

(63) Continuation of application No. 10/384,083, filed on Mar. 7, 2003, now Pat. No. 7,493,500.

(51) Int. Cl.
*G06F 1/26* (2006.01)
*H04W 52/02* (2009.01)
*H01M 2/02* (2006.01)
*H01M 10/0525* (2010.01)

(52) U.S. Cl.
CPC .......... *H04W 52/0254* (2013.01); *G06F 1/263* (2013.01); *H04W 52/0296* (2013.01); *H01M 2/0207* (2013.01); *H01M 10/0525* (2013.01)
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | |
|---|---|---|---|
| 5,569,520 A | 10/1996 | Bates |
| 5,612,152 A | 3/1997 | Bates |
| 5,757,582 A | 5/1998 | White et al. |
| 5,930,090 A | 7/1999 | Schick et al. |
| 5,949,418 A | 9/1999 | Shields et al. |
| 6,088,220 A | 7/2000 | Katz |
| 6,157,958 A | 12/2000 | Armitage et al. |
| 6,189,056 B1 | 2/2001 | Ogura et al. |
| 6,282,082 B1 | 8/2001 | Armitage et al. |
| 6,373,222 B2 | 4/2002 | Odaohhara |

(Continued)

FOREIGN PATENT DOCUMENTS

EP 563230 2/2000

OTHER PUBLICATIONS

Hammerhead-HRT Tablet PC, Nov. 25, 2002, pp. 1-5.*

(Continued)

*Primary Examiner* — M Elamin
(74) *Attorney, Agent, or Firm* — Morris & Kamlay LLP

(57) ABSTRACT

The present invention features a personal computing device that may be powered by a single battery having a single lithium-ion cell or by a plurality of lithium-ion cells connected in parallel. The personal computing device may provide computing power comparable to that of conventional laptop computers and execute an operating system and application software comparable to that executed by conventional laptop computers. Furthermore, the battery's time between charging, when used to power the personal computing device, may be similar to the time between charging of a multi-cell battery when used to power a conventional laptop computer.

43 Claims, 4 Drawing Sheets

(56) References Cited

U.S. PATENT DOCUMENTS

| | | | |
|---|---|---|---|
| 6,424,369 B1 | 7/2002 | Adair et al. | |
| 6,480,377 B2 | 11/2002 | Genest et al. | |
| 6,542,721 B2 | 4/2003 | Boesen | |
| 6,571,343 B1 | 5/2003 | Johnson et al. | |
| 6,587,304 B2 | 7/2003 | Edwards et al. | |
| 6,671,170 B2 | 12/2003 | Webb et al. | |
| 6,895,618 B2 | 5/2005 | Jahrling | |
| 7,493,500 B2* | 2/2009 | Chin et al. | 713/300 |
| 2002/0067408 A1* | 6/2002 | Adair et al. | 348/76 |
| 2002/0173344 A1* | 11/2002 | Cupps et al. | 455/566 |
| 2005/0213298 A1 | 9/2005 | Doherty et al. | |

OTHER PUBLICATIONS

On Semiconductor, NCP1800 Single-Cell Lithium Ion Battery Charge Controller, Nov. 2002, 12, http://www.onsemi.com/pub/Collateral/NCP1800-D.pdf.

Valence Technology, Inc. Products, 2001, 2, http://www.valence.com/products.asp.

Superior Battery TRIMOL GROUP, Inc., Technology for Portable Electronic Devices, 2001, 2, http://www.trimolgroup.com/media_aluminum/TMOL%20specs4.pdf.

Linear Technology, Single Cell Lithium-Ion Linear Battery Cahrger Controllers, 1999, 12, http://www.linear.com/pdf/1731f.pdf.

Valence Technology, Incl., VM4172140, 1, http://www.valence.com/pdffiles/VM4172140.pdf.

Valence Technology, "Valence Technology, Inc.", originally available at http://www.valence.com, Mar. 2, 2001, obtained from http://web.archive.org.

Valence Technology, Inc., "Prouct Spect Sheets," originally available at http://www.valence.com/products/index.htm, Mar. 2, 2001, obtained from http://web.archive.org.

Valence Technology, Inc., Lithium Ion Polymer Product Data Sheet, Model 25 Series (IMP0X/25/110), Mar. 2, 2001, originally available at http://www.valence.com/products, obtained via http://web.archive.org.

Valence Technology, Inc., Lithium Ion Polymer Product Data Sheet, Model 44 Series (IMP0X/103/103), Mar. 2, 2001, originally available at http://www.valence.com/products, obtained via http://web.archive.org.

Valence Technology, Inc., Lithium Ion Polymer Product Data Sheet, Model 74 Series (IMP0X/72/140), Mar. 2, 2001, originally available at http://www.valence.com/products, obtained via http://web.archive.org.

Valence Technology, Inc., Lithium Ion Polymer Product Data Sheet, Model C35 Series, Mar. 2, 2001, originally available at http://www.valence.com/products, obtained via http://web.archive.org.

Valence Technology, Inc., Lithium Ion Polymer Product Data Sheet, Model C43 Series, Mar. 2, 2001, originally available at http://www.valence.com/products, obtained via http://web.archive.org.

Valence Technology, Inc., Lithium Ion Polymer Product Data Sheet, Model C59 Series, Mar. 2, 2001, originally available at http://www.valence.com/products/C59/C59_1.HTM, obtained via http://web.archive.org.

Valence Technology, Inc., Lithium Ion Polymer Product Data Sheet, Model C65 Series, Mar. 2, 2001, originally available at http://www.valence.com/products, obtained via http://web.archive.org.

* cited by examiner

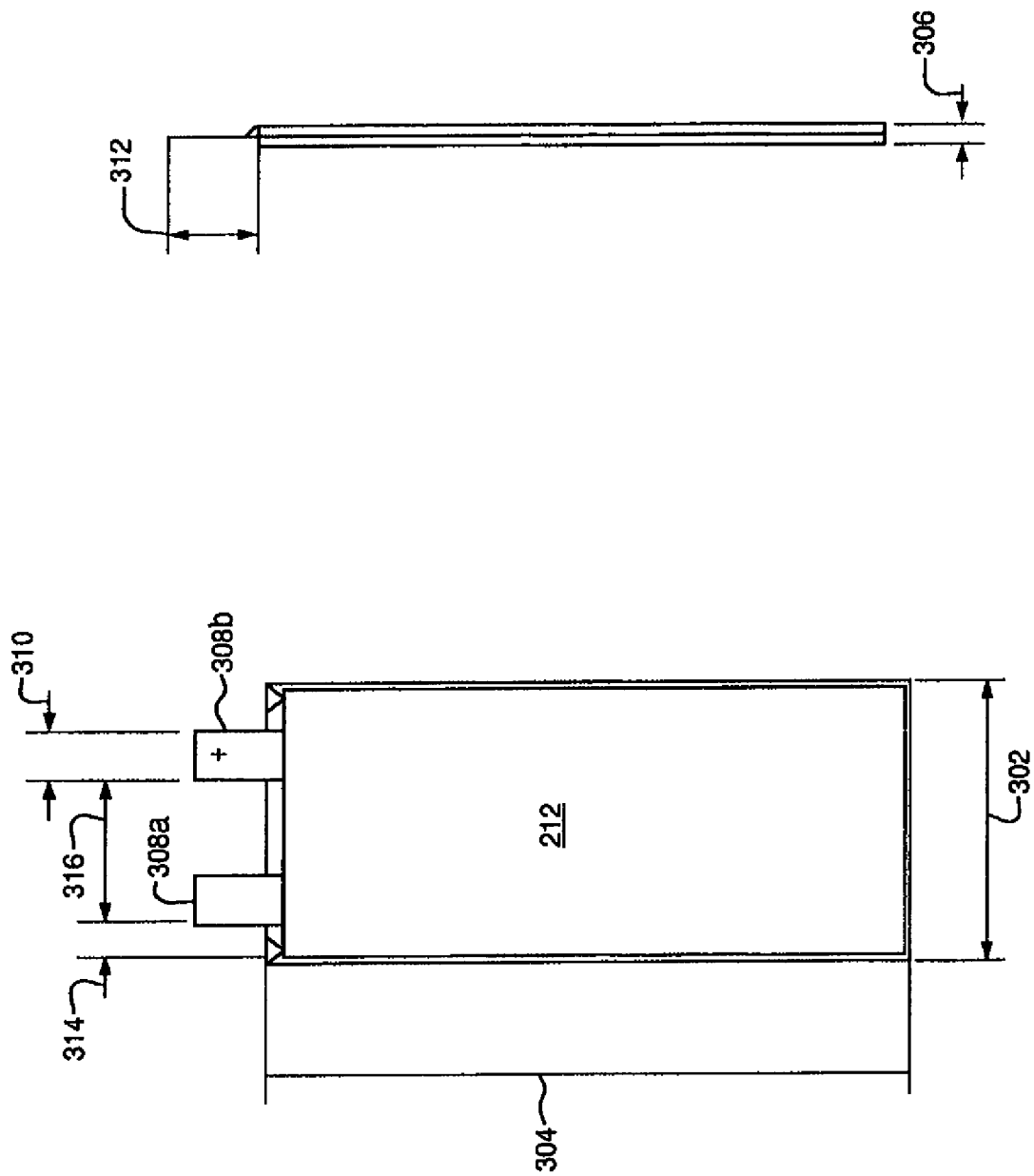

PERSONAL COMPUTING DEVICE HAVING SINGLE-CELL BATTERY

This is a continuation application of Ser. No. 10/384,083 filed on Mar. 7, 2003, now U.S. Pat. No. 7,493,500, the contents of which are hereby incorporated by reference into this application.

BACKGROUND

1. Field of the Invention

The present invention relates to computing devices and, more particularly, to power sources for personal computers.

2. Related Art

There is an increasing need for computer systems that are powerful, mobile, and inexpensive. Although mobile computing devices (such as laptop computers and personal digital assistants (PDAs)) and other mobile electronic devices (such as cellular telephones) are typically capable of receiving power either from an electrical outlet or from one or more batteries coupled to and contained within the housing of the device, the advantage of using outlet power is that it provides power for an essentially unlimited period of time. The primary disadvantage of using outlet power is that it ties the computing device to being used within the vicinity of an available outlet and thereby limits the mobility of the device. The advantage of using battery power is that it enables the device to be fully mobile while being used. One disadvantage of using battery power is that an individual battery can only provide power for a limited period of time (such as a few hours). Once a battery runs out of power, the battery must be recharged by connecting the device (or a separate charging station) to an outlet power source, often for several hours, to fully recharge the battery.

One strategy that users often adopt in response to the limited power capabilities of batteries is to travel with several fully-charged batteries, thereby enabling a discharged battery to be immediately replaced with a fully-charged battery without the need to engage in battery charging. Disadvantages of this strategy include the increased cost of additional batteries and the increased burden of traveling with several batteries, thereby effectively decreasing the overall ease of mobility of the mobile computing device.

Larger computing devices, particular those (such as laptop computers) that include power-hungry components such as hard disk drives, optical media drives, and color display monitors, typically have significantly higher power requirements than smaller computing devices such as PDAs and tablet computers. Larger computing devices therefore typically require relatively large and heavy batteries, thereby increasing the overall size and weight of the computing device and increasing the burden of traveling with such a device.

Although this problem may be mitigated by decreasing the size of the battery, doing so would result in a battery that discharges more quickly, possibly to an extent that users would find unacceptable. For these and other reasons, the tradeoff between battery size and battery power storage capacity is a persistent feature of mobile computing device design.

What is needed, therefore, are techniques for enabling the implementation of powerful mobile computing devices that are capable of running on battery power for substantial periods of time.

SUMMARY

The present invention features a personal computing device that may be powered by a single battery having a single lithium-ion cell. Alternatively, the personal computing device may be powered by a plurality of lithium-ion cells connected in parallel. The personal computing device may provide computing power comparable to that of conventional laptop computers and execute an operating system and application software comparable to that executed by conventional laptop computers. Furthermore, the battery's time between charging, when used to power the personal computing device, may be similar to the time between charging of a multi-cell battery when used to power a conventional laptop computer.

Other features and advantages of various aspects and embodiments of the present invention will become apparent from the following description and from the claims.

BRIEF DESCRIPTION OF THE DRAWINGS

FIG. 3A is a front view of a single-cell battery for use with the personal computing device of FIG. 2 according to one embodiment of the present invention; and FIG. 3B is a side view of the single-cell battery of FIG. 3A.

DETAILED DESCRIPTION

Figure 1A:
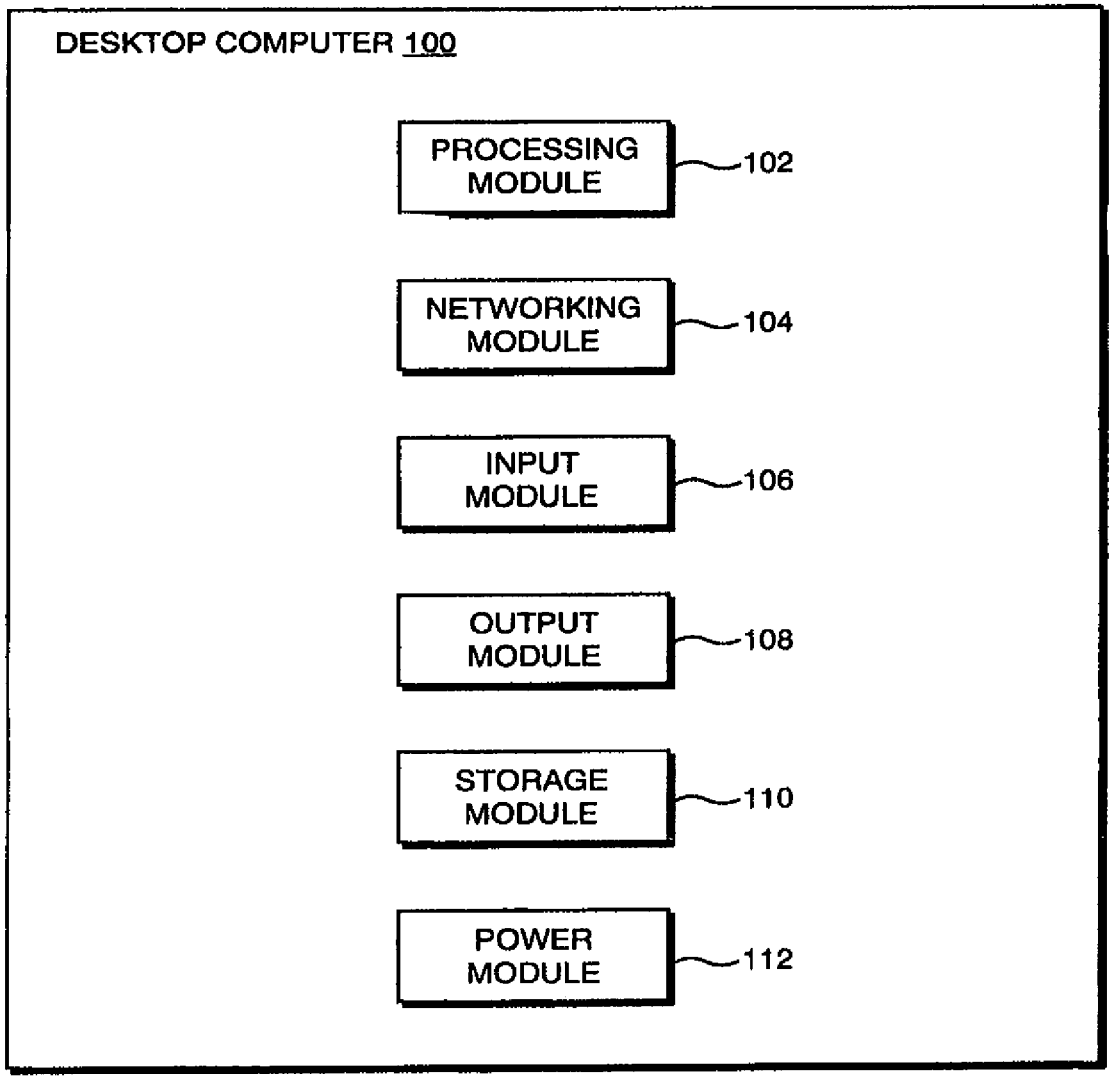
FIG. 1A is a block diagram of the functional modules included in a conventional personal computing system.

The present invention features a personal computing device that may be powered by a single battery having a single lithium-ion cell. Alternatively, the personal computing device may be powered by a plurality of lithium-ion cells connected in parallel. The personal computing device may provide computing power comparable to that of conventional laptop computers and execute an operating system and application software comparable to that executed by conventional laptop computers. Furthermore, the battery's time between charging, when used to power the personal computing device, may be similar to the time between charging of a multi-cell battery when used to power a conventional laptop computer.

Most conventional computing systems are composed of subsystems, also referred to herein as "functional modules" or simply as "modules." For example, a conventional computing system may include one or more of each of the following subsystems: (1) an information processing subsystem (which may include, for example, a central processing unit (CPU)), (2) a power input and distribution subsystem (which may include, for example, a power supply and power bus), (3) a user input subsystem (which may include, for example, a conventional mouse and/or keyboard), (4) a user output subsystem (which may include, for example, a conventional monitor and/or printer), (5) a mass media storage and access subsystem (which may include, for example, a conventional hard disk drive), and (6) a network or inter-device communication subsystem (which may include, for example, a conventional network interface card (NIC) or a serial or parallel cable). The relationship of functional modules to physical components in computer systems is described in more detail in the commonly-owned patent application Ser. No. 10/173,734, entitled "Modular Computing System," filed on Jun. 18, 2002, hereby incorporated by reference.

As used herein, the term "functional module" refers to a set of hardware and/or software in a computing system that performs a particular function. The terms "subsystem" and "module" are used synonymously with "functional module" herein. For example, a display module in a conventional desktop computer may include the computer's CPU, graphics card, video memory, monitor, and portions of the operating system that process display information. Examples of other modules include processing modules, input modules, and power modules. A functional module may be embodied in hardware, software, data and/or instruction streams, and any combination thereof. A single physical device in a computer system may be part of more than one functional module.

As used herein, the term "computer" refers to a system that includes an information processing module, a power module, a user input module, a user output module, and a storage module. These modules are interconnected to form a unified system that is powered by the power module, receives user input using the user input module, processes the user input (and other information) using the processing module, provides user output using the user output module, and stores user input (and other information) using the storage module. Examples of computers include conventional desktop computers and laptop computers.

As used herein, the term "appliance" refers to a device that includes a power module, a user input module, and a user output module, but that lacks components that provide some or all of the functionality of a conventional computer processing module and/or storage module. An appliance therefore may rely at least in part on a connection to a network system or removable media to provide the missing functionality of the processing and/or media storage modules. The modules in an appliance are interconnected to form a unified system that is powered by the power module, receives user input using the user input module, processes the user input (and other information) using the (at least partially external) processing module, provides user output using the user output module, and stores user input (and other information) using the (at least partially external) storage module. Examples of appliances include personal digital assistants, cellular telephones, and web pads.

As used herein, the term "computing system" refers to both computers and appliances. A computing system includes an input module, an output module, a power module, a processing module, and a storage module. A computing system may also include other modules, such as an interdevice communication module.

Referring to FIG. 1A, one well-known implementation of a modular computing system is the conventional desktop computer 100a, shown in block diagram form. The desktop computer 100a includes a processing module 102, a networking module 104, an input module 106, an output module 108, a storage module 110, and a power module 112.

As used herein, the term "input module" refers to any functional module (subsystem) that provides input to a computing system. Input modules may include devices such as keyboards, mice, styluses, trackballs, touch location devices such as touchpads and touch screens, microphones, scanners, cameras and video capture devices, wireless receivers, buttons, and switches. Input may, for example, be obtained by the input module as the result of actions performed by a user (such as typing on a keyboard). Input may, however, be obtained without user activity. For example, a network interface card may receive input over a network from another computer performing automated actions, and a digital camera may be configured to periodically capture images and provide them as input to a computing system without further interaction from the user.

As used herein, the term "output module" refers to any functional module (subsystem) that provides output to a user, to another module, or to another computing device. Output modules may include, for example, devices such as display monitors, speakers, printers, projectors, and wireless transmitters.

As used herein, the term "processing module" refers to any functional module (subsystem) that processes information. Processing modules may include one or more kinds of processor in any combination, such as a central processing unit (CPU) graphics processing unit, math co-processing unit, or a digital signal processor.

As used herein, the term "storage module" refers to any functional module (subsystem) that stores digital information. Storage modules may include devices such as RAM, ROM, hard disk drives, floppy disk drives, optical drives (such as CD-ROM, CD-R, CD-RW, DVD-RAM, or DVD-ROM drives), or tape drives.

As used herein, the term "interdevice communication module" refers to any functional module (subsystem) that enables a component to communicate with another component. Typically, each component that is to communicate with another component contains its own interdevice communication module. Interdevice communication modules may enable communication over any kind of connection, such as serial cables, parallel cables, USB cables, or wireless connections. Interdevice communication modules may include devices such as serial controllers, parallel controllers, and network interface cards (NICs).

Referring again to FIG. 1A, the entire processing module 102, the entire networking module 104, and most or all of the media storage module are typically embodied in components contained within a single physical housing. Although such housings have various form factors, some of which (such as the "tower" model) are designed to rest on a floor rather than a desk, all such form factors fall within the desktop computer paradigm as described herein. For purposes of explanation, any such housing and the devices contained within it are referred to herein as the "desktop component" of a desktop computer.

Figure 1B:
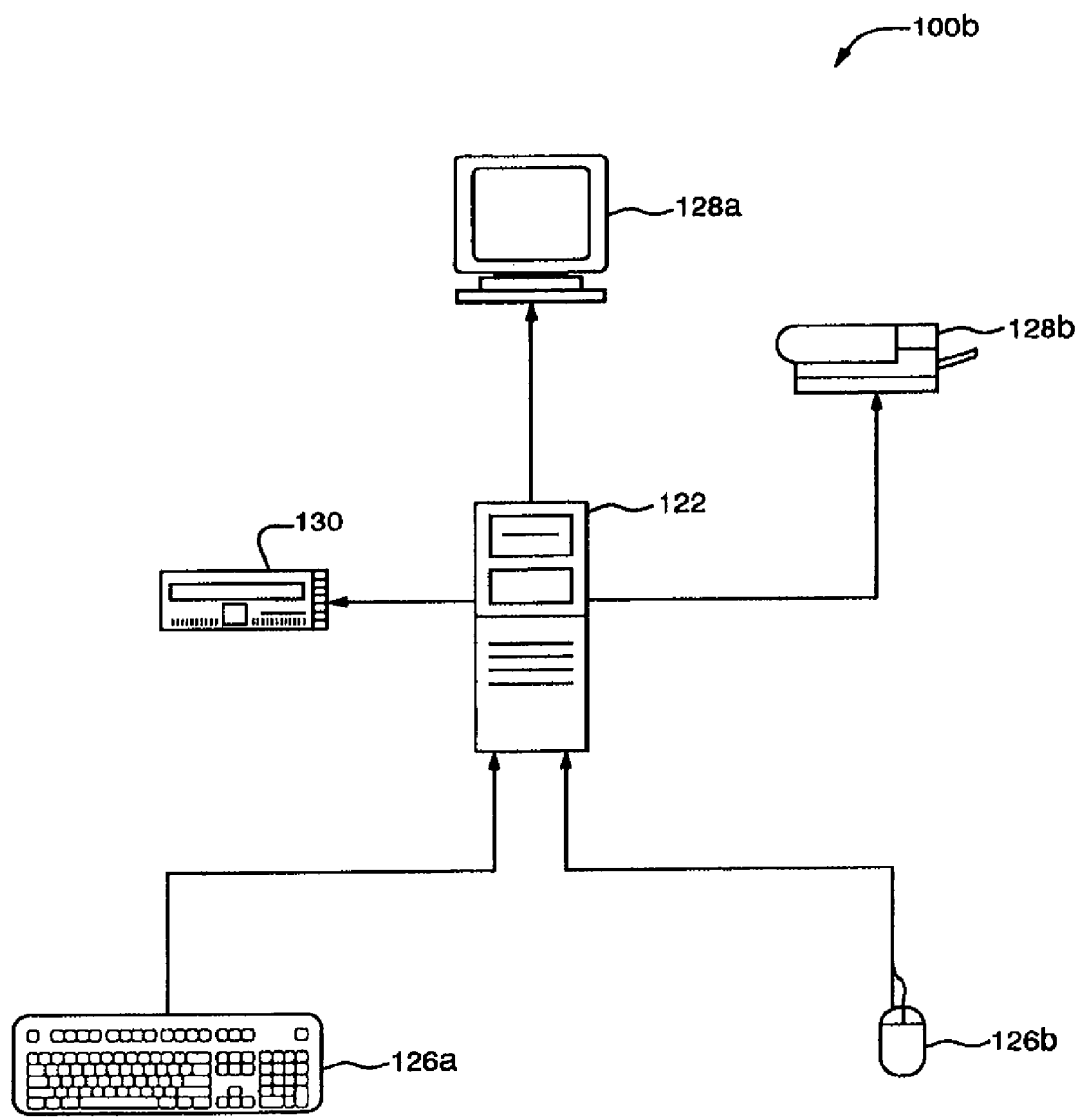
FIG. 1B is a block diagram of the physical modules contained in a conventional personal computing system.

For example, referring to FIG. 1B, the physical components of a typical desktop computer 100b are shown. The desktop computer 100b includes a desktop component 122, a keyboard 126a, a mouse 126b, a monitor 128a, and a printer 128b. The processing module 102 of the desktop computer 100b is embodied in a central processing unit (CPU) and related components within the desktop component 122. Similarly, the networking module 104 of the desktop computer 100b is embodied in a network interface card (NIC) and related components within the desktop component 122, and the power module 112 of the desktop computer 100b is embodied in a power supply, transformer, and related components within the desktop component 122. The input module 106 of the desktop computer 100b consists of a keyboard 126a, a mouse 126b, and related components within the desktop component 122. The output module 108 of the desktop computer 100b consists of a monitor 128a, a printer 128b, and related components within the desktop component 122. The storage module 110 of the desktop computer 100b consists of a hard disk drive (not shown) within the desktop component 122, an external optical storage device 130, and related components within the desktop component 122. The "related components" described above typically include device drivers and other hardware and software for communicating with and controlling the keyboard 126a, mouse 126b, monitor 128a, printer 128b, and optical storage device 130, which are typically referred to as "peripheral devices."

Conventional desktop components typically communicate with peripheral devices (such as the keyboard 126a and the printer 128b) via data ports, wireless streams, or physical connectors having various bandwidths and form factors and employing various protocols. Such peripheral devices are generally powered either independently by power modules unique to each device, or draw power parasitically from the desktop component 122.

In portable (mobile) computing systems, such as laptop computers, a single device often encapsulates a set of components that embody user input modules (e.g., keyboard, trackpad, touchpad, buttons, levers, touchscreen, stylus, operating system, etc.), user output modules (e.g., monitor, speakers, LEDs, vibration, etc.), processing modules (e.g., CPU, memory, video processor, decoder), media storage modules (e.g., hard disk drive, flash memory, smart card, ROM), and power modules (e.g., batteries, transformers, super capacitors, solar cells, springs). Encapsulation of input, output, and power modules within a single device is a common way in which portable computing systems address the need for portability. In addition to this encapsulation of multiple functional modules within a single device, portable computing systems often also include peripheral devices that provide the functionality of network modules (e.g., modems), inter-device communication modules (e.g., port replicators, expansion cards), user input modules (e.g., mice, keyboards, microphones), user output modules (e.g., printers, external speakers), and power modules (e.g., external batteries and chargers).

Laptop computers, handheld computers, and personal digital assistants (PDAs) are examples of such portable computing systems. Devices such as MP3 players, calculators, and handheld voice recorders are also portable computing systems with processing, input, output, power, and media modules specifically scaled and tailored to these niche devices. Among portable computing systems are also specialized "media readers" such as digital phones, pagers, digital cameras, tape players, CD players, wireless email devices, portable DVD-players, mini-disc players, and portable game players, which read a stream of media to the user, either from a wireless source or from a removable media source. These readers, like appliances, may have some or all of their processing or media storage modules abstracted over a network or removable device.

Figure 2:
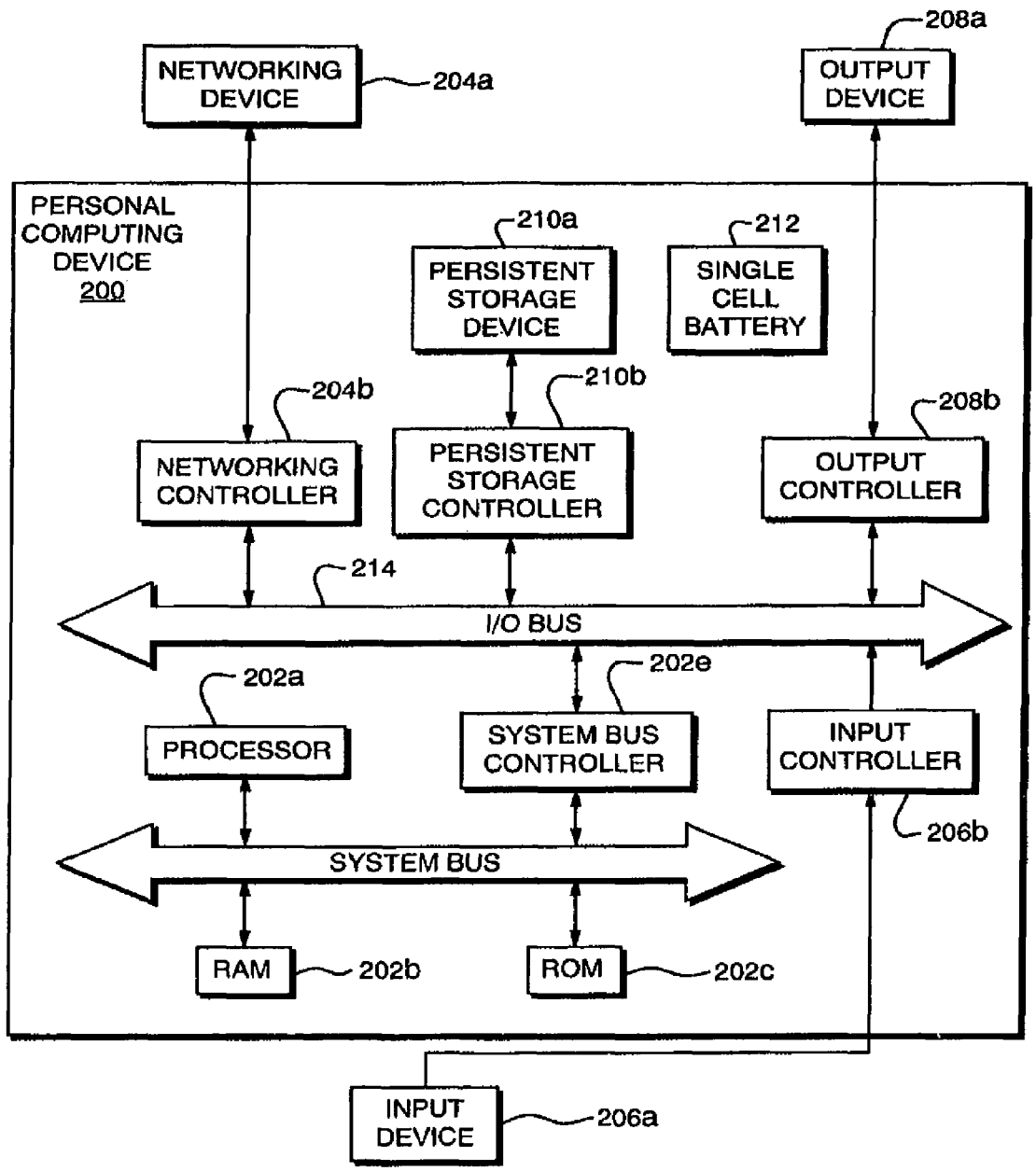
FIG. 2 is a block diagram of a personal computing device according to one embodiment of the present invention.

Referring to FIG. 2, a block diagram is shown illustrating the architecture of a personal computing device 200 according to one embodiment of the present invention. The personal computing device 200 may include all of the functional modules of a computer as that term is defined herein. For example, the personal computing device 200 includes a processor 202a, such as the Crusoe 0.13 micron 128-bit TM5800 processor from Transmeta Corporation of Santa Clara, Calif.; a random access memory (RAM) 202b, such as 8×256 Mbit DDR SDRAN available from Nanya Technology Corp. of Linkou, Taiwan; and a read-only memory 202c (ROM). The processor 202a transfers data to and from the RAM 202b and ROM 202c over a system bus 202d. A system bus controller 202e controls the flow of data between the system bus 202d and an input/output (I/O) bus 214, such as the M1535+ Southbridge from Acer Laboratories, Inc. of San Jose, Calif. The processor 202a, RAM 202b, ROM 202c, system bus 202d, and system bus controller 202e are examples of components that implement a processing module.

The processor 202a may be a processor, such as the Crusoe processor mentioned above, suitable for use in a conventional laptop or desktop computer, and not typically found in appliances. Furthermore, the RAM 202b may be RAM (such as DDR SDRAM) that is suitable for use in a conventional laptop or desktop computer and not typically found in appliances.

The personal computing device 200 also includes a networking device 204a for enabling the personal computing device 200 to communicate with other devices. A networking controller 204b controls the flow of data between the networking device 204a and the I/O bus 214. For example, the networking controller 204b may be an 802.11b wireless controller, such as the AT76C505 controller from Atmel Corporation of San Jose, Calif. Alternatively, the networking controller 204b may, for example, be a Bluetooth (IEEE 1394) controller, such as the ZC2001 controller from Zeevo, Inc. of Santa Clara, Calif.

The networking device 204a and networking controller 204e are examples of components that implement a networking module. Although the networking device 204a is illustrated as external to the personal computing device 200 in FIG. 2, the networking device 204a alternatively may be contained within the personal computing device 200. The term "networking" is used broadly herein to refer to any interdevice communication, and therefore encompasses not only communication performed according to "networking" protocols such as TCP/IP or 802.11b, but also to communication performed using direct device-to-device communications means, such as serial, parallel, and SCSI cables.

The personal computing device 200 may, for example, include one or more FireWire connectors for engaging in high-speed networking with other FireWire-enabled devices. FireWire is defined by IEEE Standard 1394b, draft 1.0, dated Feb. 25, 2000, hereby incorporated by reference. In addition, the personal computing device 200 may include one or more conventional computer buses such as a serial Peripheral Component Interconnect (PCI) bus and/or an Industry Standard Architecture (ISA) bus.

The personal computing device 200 also includes an input device 206a for enabling the personal computing device 200 to receive input from users. An input controller 206b controls the flow of data from the input device 206a to the I/O bus 214. The input device 206a and input controller 206b are examples of components that implement an input module. Mice, keyboards, and trackpads are examples of input devices.

The personal computing device 200 also includes an output device 208a for enabling the personal computing device 200 to provide output to users. In one embodiment, the output device 208a is a 5-inch Transflective WVGA TFT LCD (800*480, 64 k color) active-matrix transflective color display from Samsung Electronics, Ltd. of Hong Kong. An output controller 208b controls the flow of data from the I/O bus 214 to the output device 208a. The output device 208a and output controller 208b are examples of components that implement an output module. Although the output device 208a is illustrated as external to the personal computing device 200 in FIG. 2, the output device 208a alternatively may be contained within the personal computing device 200. Monitors and printers are examples of output devices.

The personal computing device 200 also includes a persistent storage device 210a for enabling the personal computing device 200 to store data on a tangible medium. In one embodiment, the persistent storage device 210a is a model MK2003GAH hard disk drive from Toshiba America Electronic Components, Inc. of Irvine, Calif. A persistent storage controller 210b controls the flow of data between the persistent storage device 210 and the I/O bus 214. The persistent storage device 210a and persistent storage controller 210b are examples of components that implement a storage module. Hard disk drives, optical drives (such as CD drives and DVD drives), floppy disk drives, and tape-drives are examples of persistent storage devices.

The personal computing device 200 may be enclosed in a small housing and be lightweight. For example, in one embodiment of the present invention, the housing of the personal computing device 200 is 4.1" (105 mm) wide by 2.9" (74 mm) long by 0.9" (22 mm) high, and weighs less than 9 ounces (250 grams). The personal computing device 200 may therefore be small and lightweight enough to be at least as portable as a conventional laptop computer.

The personal computing device 200 also includes a single-cell battery 212 for providing power to the other components of the personal computing device 200. Although the connections between the battery 212 and the remaining components of the personal computing device 200 are not shown in FIG. 2 for ease of illustration, those of ordinary skill in the art will appreciate how to implement such connections. The single-cell battery 212 and associated circuitry are an example of a power module. Alternatively, the personal computing device may be powered by a plurality of lithium-ion cells connected in parallel.

The personal computing device 200 may be small and lightweight enough to be at least as portable as a conventional laptop computer and provide computing power comparable to that of conventional laptop computers. Conventional laptop computers, however, typically are designed for use with multi-cell lithium-ion batteries. Each such battery includes a plurality of lithium-ion cells connected in series. Multi-cell batteries have been necessary to power conventional laptop computers because of the relatively high power requirements of such computers.

Smaller mobile electronic devices, such as personal digital assistants (PDAs) and cellular telephones, are often designed for use with single-cell lithium-ion batteries. It has been possible for such devices to use single-cell batteries because such devices typically have significantly lower power requirements than laptop computers. A PDA, for example, typically has a much smaller display screen than a laptop computer and lacks a powerful central processor which consumes such a dominant fraction of the power of laptop computers. Although PDAs and cell phones are capable of running on batteries that are smaller and less heavy than laptop batteries, this feature comes at the expense of computing power. PDAs and cell phones, for example, typically are not capable of executing full-scale desktop operating systems or full-scale desktop software applications.

In contrast, the personal computing device 200 shown in FIG. 2 may provide computing power comparable to that of conventional laptop computers and execute an operating system (such as the Microsoft® Windows® 2000 Professional operating system) and application software (such as the Microsoft® Office business application suite) comparable to that executed by conventional personal (desktop and laptop) computers. Such operating systems are typically not found in appliances. Furthermore, the discharge time of the battery 212, when used to power the personal computing device 200, may be similar to the discharge time of a multi-cell battery when used to power a conventional laptop computer. For example, when the personal computing device 200 is implemented using the particular example components described above, the life of the battery may be approximately 3-6 hours. In this sense, the personal computing device 200 is an example of a personal computer (PC).

In one embodiment of the present invention, for example, the single-cell battery 212 is a single-cell lithium-ion battery, such as the VM4172140 single-cell battery, available from Valence Technology, Inc. of Austin, Tex. Referring to FIGS. 3A-3B, in this embodiment the battery 212 has a width 302 of 72.0±0.5 mm, a length 304 of 140.0±0.5 mm, and a maximum thickness 306 of 4.1 mm. Each of the terminals 308a-b of the battery 212 has a width 310 of 12.5 mm, a height 312 of 20.0±50 mm, and a negligible thickness. Each of the terminals 308a-b is offset from the edge of the battery 212 by a distance 314 of 11.2 mm, and corresponding edges of the terminals 308a-b are separate by a distance 316 of 37.2 mm.

In this embodiment the battery 212 has a nominal operating voltage of 3.8 VDC and a capacity of 2750 mAh, with a constant C/2 current to 4.2 Volt limit, then constant voltage (4.2V) with floating current taper to C/20, then discharge at C/5. The battery has an initial impedance of 0.20 mOhm, measured at 30% SOC, 1 kHz AC. The battery weighs 79 g and has an operating temperature range of −20 to +60° C. Unless otherwise stated, all values just stated are nominal and test conditions are at 23° C., C/2 charge rate and C/5 discharge rate.

In one embodiment of the present invention, for example, the maximum expected power consumption of the primary components of the personal computer device 200 are as shown in Table 1.

TABLE 1

| Component | Maximum Power Consumption (mW) |
|---|---|
| Display (e.g., output device 208a) | 300 |
| Display backlight | 400 |
| Graphics controller | 477 |
| Southbridge (e.g., I/O bus 214) | 250 |
| Processor 202a | 7500 |
| Hard drive (e.g., storage device 210a) | 1300 |
| 802.11b wireless (e.g., networking device 204a) | 1304 |
| Bluetooth wireless (e.g., networking device 204a) | 100 |
| Clock generator | 100 |
| Audio CODEC | 270 |
| Headphone amplifier | 200 |
| RAM 202b | 877 |
| USB power out | 2500 |
| Cooling fan | 600 |

The sum of the values shown in Table 1 is approximately watts. The VM4172140 battery has a capacity of 15.8 Watt-hours. The expected life of the battery 212 under the conditions assumed for Table 1, therefore, is approximately one hour. The values shown in Table 1, however, are maximum reasonable steady-state power consumption values. The rate during normal use will typically be several times lower than the total value of 16.2 watts, because all components of the personal computing device 200 seldom operate at their maximum consumption levels either simultaneously or for long periods of time. Typical power consumption is expected to be on the order of 2.5-5 W. As a result, the typical battery life is expected to be in the range of 3-6 hours, based on the particular components shown in Table 1.

Among the advantages of the invention are one or more of the following. The use of a single-cell battery rather than a multiple-cell battery may enable the personal computing device 200 to be smaller, lighter, and less expensive to manufacture than computing devices having comparable computing power.

In addition, the use of a single-cell battery or multiple cells in parallel makes it possible to use particularly small DC-DC converters, thereby enabling the personal computing device 200 to have a particularly small size. The smallest DC-DC converters currently available include the VT103, VT201, VT202 and VT223 converters, available from Volterra Semiconductor Corporation of Fremont, Calif. Such converters cannot run from the higher voltages provided by two lithium cells in series. The use of a single lithium cell or multiple lithium-ion cells in parallel, therefore, advantageously enables the use of particularly small DC-DC converters.

Another advantage of embodiments of the present invention is that they may enable both step-up and step-down DC-DC power converters in the personal computing device 200 to operate more efficiently. As is well-known to those of ordinary skill in the art, both step-up and step-down DC-DC converters operate at higher efficiencies when the output voltage is closer to the input voltage. Therefore, providing an architecture which uses a low-voltage battery, such as the single-cell battery 212, enables DC-DC converters in the personal computing device 200 to operate more efficiently than in systems requiring higher-voltage power sources. It is to be understood that although the invention has been described above in terms of particular embodiments, the foregoing embodiments are provided as illustrative only, and do not limit or define the scope of the invention. Various other embodiments are also within the scope of the claims. For example, elements and components described herein may be further divided into additional components or joined together to form fewer components for performing the same functions.

Although the personal computing device 200 is described above as executing the Microsoft® Windows® 2000 Professional operating system, this is not a limitation of the present invention. Rather, embodiments of the present invention may be used in conjunction with other operating systems. For example, embodiments of the present invention may be used in conjunction with any operating system that is compliant with the Win32 application program interface (API), such as Microsoft Windows® 98, Microsoft Windows® ME, and Microsoft Windows NT®, and Microsoft Windows XP.

Although one embodiment of the battery 212 described above utilizes Manganese cathode material, this is not a limitation of the present invention. Rather, other chemistries may be used, such as Cobalt or Phosphate materials. Furthermore, the particular dimensions and other properties of the battery 212 described herein are provided merely for purposes of example and do not constitute limitations of the present invention.

The invention claimed is:

1. A device comprising:
a processing subsystem;
an input subsystem;
a display;
a wireless communication subsystem;
an operating system suitable for execution on a desktop computer or laptop computer;
one single-cell battery; and
a power subsystem having power supplied by the single-cell battery and configured to provide operating power to each of the display, processing, input, and wireless communication subsystems.

2. The device of claim 1, wherein the wireless communication subsystem includes an 802.11-compliant wireless network controller.

3. The device of claim 1, wherein the single-cell battery is a lithium ion battery.

4. The device of claim 1, wherein the single-cell battery has a nominal operating voltage of approximately 3.8 volts DC.

5. The device of claim 1, wherein the processing subsystem includes a processor operatively coupled to DDR SDRAM memory.

6. The device of claim 1, wherein the wireless communication subsystem includes a Bluetooth-compliant wireless controller.

7. The device of claim 1, further comprising an interdevice communication subsystem configured to provide communication between the device and an external device via a serial connection.

8. The device of claim 7, wherein the interdevice communication subsystem is compliant with an IEEE 1394 serial interface.

9. The device of claim 1, wherein the device is configured to operate approximately 3-6 hours under a normal operating condition using power supplied solely by the single-cell battery.

10. The device of claim 1, wherein the device has a weight of less than 9 ounces.

11. The device of claim 1, wherein the device has a size comparable to a personal digital assistant (PDA) device configured to be held in the palm of a user.

12. The device of claim 1, wherein the device has a width of approximately 2.9 inches or less.

13. The device of claim 1, wherein the display has a resolution of approximately 800×480 pixels.

14. The device of claim 1, further comprising one or more applications having functionality comparable to corresponding applications configured to be executed on a desktop computer or laptop computer.

15. The device of claim 1, wherein the device comprises a cellular phone.

16. The device of claim 1, wherein the input subsystem comprises a touchscreen display.

17. The device of claim 1, further comprising a persistent storage subsystem.

18. The device of claim 1, further comprising an application comparable to a corresponding version of the application configured to be executed on a desktop computer or laptop computer.

19. The device of claim 1, wherein the single-cell battery is not connected in series with any other single-cell battery.

20. The device of claim 19, wherein the power subsystem comprises at least one single-cell lithium-ion battery with a nominal operating voltage of approximately 3.8 volts DC.

21. The device of claim 1, wherein:
the processing subsystem comprises a processor and random access memory;
the input subsystem comprises a touchscreen display; and
the single single-cell battery is not connected in series with any other single-cell battery.

22. The device of claim 1, wherein the power subsystem comprises a plurality of single-cell lithium-ion batteries connected in parallel.

23. The device of claim 1, wherein the device has a largest surface area of about 12 square inches or less.

24. The device of claim 1, wherein the device comprises a cellular phone.

25. The device of claim 1, wherein the device comprises a web pad.

26. The device of claim 1, wherein the device comprises a tablet computer.

27. The device of claim 1, further comprising a persistent storage subsystem.

28. The device of claim 1, wherein the device comprises a mobile hand-held device.

29. The device of claim 1, wherein the power subsystem includes a plurality of single-cell batteries connected in parallel.

30. A device comprising:
- a processing subsystem including a processor and random access memory;
- an input subsystem including a touchscreen display;
- a wireless communication subsystem;
- an operating system stored on the device and suitable for execution of one or more applications configured to be executed on a full-scale desktop operating system;
- a power module including a single-cell battery and configured to supply power to the processing, input, and wireless communication subsystems, wherein the single-cell battery is not connected in series with any other single-cell battery.

31. The device of claim 30, wherein the display has a resolution of 800×480 pixels.

32. The device of claim 30, further comprising one or more applications comparable to corresponding full-scale applications configured to be executed on a full-scale desktop operating system.

33. The device of claim 30, wherein the device has a weight of less than 9 ounces.

34. The device of claim 30, wherein the processing subsystem includes a processor operatively coupled to DDR SDRAM memory.

35. The device of claim 30, wherein the wireless communication subsystem includes a Bluetooth-compliant wireless controller.

36. The device of claim 30, further comprising an interdevice communication subsystem configured to provide communication between the device and an external device via a serial connection.

37. The device of claim 36, wherein the interdevice communication subsystem is compliant with an IEEE 1394 serial interface.

38. The device of claim 30, wherein the device comprises a cellular phone.

39. The device of claim 30, wherein the device comprises a web pad.

40. The device of claim 30, wherein the device comprises a tablet computer.

41. The device of claim 30, further comprising a persistent storage subsystem.

42. The device of claim 1, wherein the one or more applications include at least one application from the Microsoft Office business application suite.

43. The device of claim 30, wherein the one or more applications include at least one application from the Microsoft Office business application suite.

* * * * *